United States Patent
Odaka et al.

(10) Patent No.: US 9,325,896 B2
(45) Date of Patent: Apr. 26, 2016

(54) IMAGE PICKUP APPARATUS FOR PERFORMING FOCUS DETECTION IN WHICH AN INFLUENCE OF A FOCUS SHIFT CAUSED BY AN ABERRATION IS SUPPRESSED, LENS UNIT, AND METHODS OF CONTROLLING IMAGE PICKUP APPARATUS AND LENS UNIT

(71) Applicant: CANON KABUSHIKI KAISHA, Tokyo (JP)

(72) Inventors: Yukio Odaka, Kawasaki (JP); Shinichiro Yano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 14/243,161

(22) Filed: Apr. 2, 2014

(65) Prior Publication Data
US 2014/0300801 A1    Oct. 9, 2014

(30) Foreign Application Priority Data
Apr. 5, 2013   (JP) ................... 2013-079723

(51) Int. Cl.
*G03B 13/00*    (2006.01)
*H04N 5/232*    (2006.01)
(Continued)

(52) U.S. Cl.
CPC ............ *H04N 5/23212* (2013.01); *G02B 7/102* (2013.01); *H04N 5/23209* (2013.01); *H04N 5/3696* (2013.01)

(58) Field of Classification Search
CPC ............ H04N 5/23212; H04N 5/3696; H04N 5/23209; G02B 7/102
USPC .................... 348/345, 349–351, 353–356
See application file for complete search history.

(56) References Cited

U.S. PATENT DOCUMENTS

| | | | |
|---|---|---|---|
| 8,384,815 B2 * | 2/2013 | Shintani | ............ 348/311 |
| 8,514,321 B2 * | 8/2013 | Park | ............ G01J 3/02 |
| | | | 348/336 |

(Continued)

FOREIGN PATENT DOCUMENTS

| | | |
|---|---|---|
| JP | 01-221728 A | 9/1989 |
| JP | 2001-083407 A | 3/2001 |

(Continued)

OTHER PUBLICATIONS

The above foreign patent documents were cited in the Aug. 25, 2015 Japanese Office Action, which is enclosed without an English Translation, that issued in Japanese Patent Application No. 2013-079723.

*Primary Examiner* — Ngoc-Yen Vu
(74) *Attorney, Agent, or Firm* — Cowan, Liebowitz & Latman, P.C.

(57) ABSTRACT

An image pickup apparatus on which a lens unit is to be removably mounted includes an image pickup element, a first focus detection unit which performs a focus detection by a contrast detection method based on a signal output from the image pickup element, a second focus detection unit which performs a focus detection by a phase difference detection method based on a pair of image signals output from the image pickup element, and a control unit which performs a focus control based on an in-focus position detected by the first or second focus detection unit, and the control unit receives, from the mounted lens unit, first information related to a displacement of the in-focus position by the phase difference detection method and determines whether to use the second focus detection unit for the focus control according to the first information.

14 Claims, 12 Drawing Sheets

(51) Int. Cl.
*H04N 5/369* (2011.01)
*G02B 7/10* (2006.01)

(56) References Cited

U.S. PATENT DOCUMENTS 8,619,180 B2 * 12/2013 Kimura .......................... 348/345
8,774,616 B2 * 7/2014 Nakata ............................ 396/76
2012/0081594 A1 * 4/2012 Makigaki ...................... 348/340
2015/0117719 A1 * 4/2015 Sakai ....................... G06T 5/006
382/106

FOREIGN PATENT DOCUMENTS

| JP | 2010-066495 A | 3/2010 |
| JP | 2012-008424 A | 1/2012 |
| JP | 2012-118154 A | 6/2012 |

* cited by examiner

| \<td colspan=4\>TABLE RELEVANT TO BF CORRECTION STORED IN IMAGE PICKUP APPARATUS | | | |
|---|---|---|---|
| LENS ID | BF SHIFT AMOUNT | PRESENCE OR ABSENCE OF BF CORRECTION VALUE | BF CORRECTION VALUE |
| 01 | LARGE | ABSENCE | — |
| 02 | LARGE | ABSENCE | — |
| 03 | LARGE | PRESENCE | +60um |
| 04 | LARGE | PRESENCE | −50um |
| 05 | SMALL | ABSENCE | — |
| 06 | SMALL | ABSENCE | — |
| 07 | SMALL | ABSENCE | — |
| 08 | SMALL | ABSENCE | — |
| 09 | SMALL | ABSENCE | — |
| 10 | SMALL | ABSENCE | — |

A0 COMMUNICATION

| | COMMAND | DATA 1 | DATA 2 |
|---|---|---|---|
| DATA SENT FROM IMAGE PICKUP APPARATUS (IMAGE PICKUP APPARATUS TO LENS) | A0 | FF | FF |
| DATA RECEIVED BY IMAGE PICKUP APPARATUS (LENS TO IMAGE PICKUP APPARATUS) | XX | A0 | 00: NEW-COMMUNICATION INCOMPATIBLE LENS<br>01: NEW-COMMUNICATION COMPATIBLE LENS |

B0 COMMUNICATION

| | COMMAND | DATA 1 | DATA 2 |
|---|---|---|---|
| DATA SENT FROM IMAGE PICKUP APPARATUS (IMAGE PICKUP APPARATUS TO LENS) | B0 | FF | FF |
| DATA RECEIVED BY IMAGE PICKUP APPARATUS (LENS TO IMAGE PICKUP APPARATUS) | XX | B0 | BF INFORMATION<br>00: THERE IS NO BF SHIFT<br>01: THERE IS BF SHIFT (THERE IS BF CORRECTION VALUE)<br>02: THERE IS BF SHIFT (THERE IS NO BF CORRECTION VALUE) |

C0 COMMUNICATION

| | COMMAND | DATA 1 | DATA 2 | ~ | DATA X |
|---|---|---|---|---|---|
| DATA SENT FROM IMAGE PICKUP APPARATUS (IMAGE PICKUP APPARATUS TO LENS) | C0 | FF | FF | ~ | FF |
| DATA RECEIVED BY IMAGE PICKUP APPARATUS (LENS TO IMAGE PICKUP APPARATUS) | XX | C0 | BF CORRECTION VALUE | ~ | BF CORRECTION VALUE |

80 COMMUNICATION

| | COMMAND | DATA 1 | DATA 2 | DATA 3 | DATA 4 |
|---|---|---|---|---|---|
| DATA SENT FROM IMAGE PICKUP APPARATUS (IMAGE PICKUP APPARATUS TO LENS) | 80 | FF | FF | FF | FF |
| DATA RECEIVED BY IMAGE PICKUP APPARATUS (LENS TO IMAGE PICKUP APPARATUS) | XX | 80 | LENS ID | SERIAL NUMBER (HIGHER) | SERIAL NUMBER (LOWER) |

FIG. 12

FIG. 13A
PIXEL CONFIGURATION NOT FOR IMAGING PLANE PHASE DIFFERENCE METHOD

| R | Gr | R | Gr | R | Gr | R | Gr |
|---|----|---|----|---|----|---|----|
| Gb | B | Gb | B | Gb | B | Gb | B |

FIG. 13B
PIXEL CONFIGURATION FOR IMAGING PLANE PHASE DIFFERENCE METHOD

| R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B |

IMAGE PICKUP APPARATUS FOR PERFORMING FOCUS DETECTION IN WHICH AN INFLUENCE OF A FOCUS SHIFT CAUSED BY AN ABERRATION IS SUPPRESSED, LENS UNIT, AND METHODS OF CONTROLLING IMAGE PICKUP APPARATUS AND LENS UNIT

BACKGROUND OF THE INVENTION

1. Field of the Invention

The present invention relates to an image pickup apparatus including different types of focus detection units.

2. Description of the Related Art

Conventionally, as focus detection methods of an image pickup apparatus, a phase difference detection method which detects a pair of image signals obtained from a light beam that has passed through different pupil regions of an optical system and a contrast detection method which uses a contrast component of an image signal have been known. In addition, as one of the phase difference detection methods, an imaging plane phase difference detection method has been known which performs focus detection by the phase difference detection method by using an output from an image pickup element.

Japanese Patent Laid-Open No. ("JP") 2001-083407 discloses, as a focus detection method adopting the imaging plane phase difference detection method, a configuration in which each of a plurality of photodiodes (hereinafter, referred to as "PDs") provided to its corresponding micro lens receives light from pupil regions different from each other. Such a configuration enables focus detection by the phase difference detection method by comparing outputs of two PDs.

The image pickup apparatus has been known which allows a user to select an AF method from a plurality of AF methods such as the phase difference detection method and the contrast method. JP 2012-118154 discloses a configuration which selects the contrast detection method using a wobbling lens because narrowing down an aperture stop results in a decrease in accuracy of autofocusing (AF method) by the phase difference detection method.

In the focus detection by the imaging plane phase difference detection method, some lenses suffer from a displacement of an in-focus position (hereinafter, referred to as a "best focus (BF) shift") which is caused by an aberration and a chromatic aberration of an object light beam of a shot image and that of the focus detection. Due to this drawback, some interchangeable lenses designed to be mounted on an image pickup apparatus may not be able to satisfy an in-focus accuracy allowable as a still image. If an image pickup apparatus stores a correction values (hereinafter, referred to as a "best focus (BF) correction value") designed to correct the BP shift for every type of interchangeable lens, an extremely large amount of data capacity is required. Furthermore, in order to make it possible to correct the BF shift for interchangeable lenses to be released in the future, firmware updating and other measures are required and this approach is inefficient.

SUMMARY OF THE INVENTION

The present invention provides an image pickup apparatus, a lens unit, and methods of controlling the image pickup apparatus and the lens unit which are capable of performing an appropriate focus detection in which an influence of a focus shift caused by an aberration is suppressed.

An image pickup apparatus as one aspect of the present invention is an image pickup apparatus on which a lens unit is to be removably mounted, includes an image pickup element including a plurality of pixels, each of which includes a plurality of photodiodes corresponding to a micro lens, a first focus detection unit configured to perform a focus detection by a contrast detection method based on a signal output from the image pickup element, a second focus detection unit configured to perform a focus detection by a phase difference detection method based on a pair of image signals output from the image pickup element, and a control unit configured to perform a focus control based on an in-focus position detected by one of the first focus detection unit and the second focus detection unit, and the control unit is configured to receive, from the mounted lens unit, first information related to a displacement of the in-focus position by the phase difference detection method caused by an aberration of an image pickup optical system of the lens unit and determine whether to use the second focus detection unit for the focus control according to the first information.

A lens unit as another aspect of the present invention is a lens unit to be removably mounted on an image pickup apparatus, includes an image pickup optical system, and a lens controller configured to send data to the mounted image pickup apparatus, the lens controller is configured to send, to the image pickup apparatus, first information related to a displacement of an in-focus position by the phase difference detection method caused by an aberration of the image pickup optical system, and the first information indicates that there is the displacement of the in-focus position and contains information on a correction value to correct the displacement of the in-focus position.

A method of controlling an image pickup apparatus as another aspect of the present invention is a method of controlling an image pickup apparatus on which a lens unit is to be removably mounted, the image pickup apparatus includes an image pickup element including a plurality of pixels, each of which includes a plurality of photodiodes corresponding to a micro lens, the method includes a first focus detection step of performing a focus detection by a contrast detection method based on a signal output from the image pickup element, a second focus detection step of performing a focus detection by a phase difference detection method based on a pair of image signals output from the image pickup element, and a control step of performing a focus control based on an in-focus position detected in one of the first focus detection step and the second focus detection step, and, in the control step, first information related to a displacement of the in-focus position by the phase difference detection method caused by an aberration of an image pickup optical system of the mounted lens unit is received from the lens unit and then whether to use a result of the second focus detection step for the focus control is determined according to the first information.

A method of controlling a lens unit as another aspect of the present invention is a method of controlling a lens unit removably mounted on an image pickup apparatus, the lens unit includes an image pickup optical system, the method includes a control step of sending data to the mounted image pickup apparatus, in the control step, first information related to a displacement of an in-focus position by the phase difference detection method caused by an aberration of the image pickup optical system is sent to the image pickup apparatus, and the first information indicates that there is the displacement of the in-focus position and contains information on a correction value to correct the displacement of the in-focus position.

Further features and aspects of the present invention will become apparent from the following description of exemplary embodiments with reference to the attached drawings.

BRIEF DESCRIPTION OF THE DRAWINGS

FIG. 12 is a diagram illustrating definitions of the lens communication in each of the first and second embodiments.

FIG. 13A is a diagram illustrating an example of a pixel configuration where an imaging plane phase difference detection method is not to be used.

FIG. 13B is a diagram illustrating an example of a pixel configuration where the imaging plane phase difference detection method is to be used.

DESCRIPTION OF THE EMBODIMENTS

Embodiments of the present invention will be described in detail below with reference to the attached drawings.

First Embodiment

Figure 1:
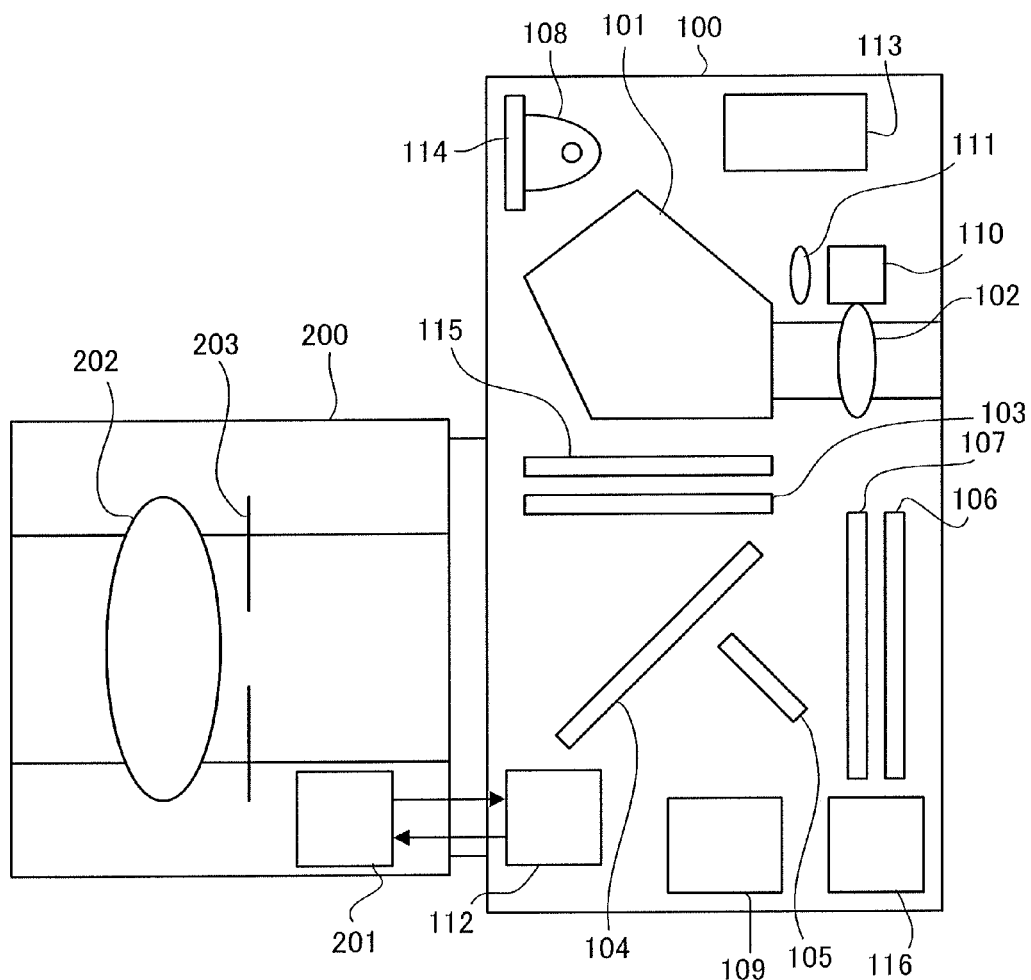
FIG. 1 is a schematic configuration diagram of an image pickup system in a first embodiment.

First of all, referring to FIG. 1, the configuration of an image pickup system in the first embodiment of the present invention will be described. FIG. 1 is a schematic configuration diagram of the image pickup system in this embodiment.

In FIG. 1, the image pickup system includes an image pickup apparatus 100 (an image pickup apparatus body, or a camera) and an interchangeable lens 200 (a lens unit) removably mounted on the image pickup apparatus 100. As described later, the image pickup apparatus 100 include an image pickup element with a plurality of pixels, each of which has a plurality of photodiodes arranged underneath a micro lens, and the photodiodes receive light from pupil regions (divided pupil regions) different from each other in an image pickup optical system including a lens 202. In this configuration, the image pickup apparatus 100 is capable of performing a focus detection method by using a phase difference detection method (an imaging plane phase difference detection method) while capturing an image. In addition, the image pickup apparatus 100 performs a focus detection by a contrast detection method by using a contrast detection method to search a position of a focus lens at which a contrast evaluation value generated from an image signal output from the image pickup element reaches a peak. The image pickup system of this embodiment is not limited to this, and is also applicable to an image pickup system constituted by the image pickup apparatus 100 to which a lens unit corresponding to the interchangeable lens 200 is integrally attached.

In the image pickup apparatus 100, reference numeral 101 denotes an erect normal image optical system constituting a finder optical system, reference numeral 102 an eyepiece. Reference numeral 103 denotes a finder screen, and reference numeral 104 denotes a main mirror configured to deflect a part of a light beam (an image-pickup light beam) to the finder optical system (the erect normal image optical system 101). Reference numeral 105 denotes a sub-mirror configured to deflect the image-pickup light beam that has passed through the main mirror 104 to a focus detection apparatus 109.

Reference numeral 106 denotes an image pickup element. The image pickup element 106 is configured to photoelectrically convert an object image formed by receiving a light beam from the object which has passed through the image pickup optical system provided inside the interchangeable lens 200 to an electrical signal to output the electrical signal. The image pickup element 106 of this embodiment includes pixels, each of which has two photodiodes, and thus is capable of generating an image signal to be used for the focus detection by the imaging plane phase difference detection method. FIGS. 13A and 13B schematically illustrate a pixel configuration incompatible with the imaging plane phase difference detection method and that compatible with the imaging plane phase difference detection method, respectively. In this embodiment, a Bayer-array primary color filter is provided in each of the pixel configurations. In the pixel configuration compatible with the imaging plane phase difference detection method illustrated in FIG. 13B, each pixel of FIG. 13A is divided into two parts in a horizontal direction to provide two photodiodes A and B. The manner of the division illustrated in FIG. 13B is an example, and hence other manners may be used, the number of divisions may be changed, or a different manner of the division may be applied depending on a pixel.

The micro lens divides the light beam entering each pixel and the two photodiodes provided in the pixel receives the divided light beams respectively, and thus two signals of an image pickup signal and an AF signal can be obtained by one pixel. That is, signals (signals A and B) obtained by the two photodiodes A and B (pixels A and B) in each pixel are two image signals for AF (the AF signals), and an addition signal (the signal A+the signal B) is the image pickup signal. As a pair of image signals to be used in an ordinary phase difference detection method is generated by a pair of line sensors including a plurality of pixels, a pair of signals to be used in the imaging plane phase difference detection method is obtained based on outputs of a plurality of the pixels A and the pixels B. A controller 112 described later performs a correlation calculation for the pair of image signals based on the AF signal to calculate an image shift amount and various kinds of reliability information.

Reference numeral 107 denotes a shutter apparatus configured to shield the image pickup element 106. Reference numeral 108 denotes a built-in strobe included inside the image pickup apparatus 100. The built-in strobe 108 not only illuminates an object during a shooting when an external strobe is not attached, but also functions as an auxiliary light which irradiates the object during the focus detection.

Reference numeral 109 denotes the focus detection apparatus. The focus detection apparatus 109 includes a plurality of sensors (line sensors), each of which has a plurality of light receiving portions, and is configured to perform the focus detection by the phase difference detection method. More specifically, the focus detection apparatus 109 is configured to divide a light beam (into two) which has passed through an exit pupil of the focus lens included in the lens 202 to cause each pair of line sensors to receive the divided light beams.

In this embodiment, two image signals obtained based on the divided light beams are defined as an image signals A and B. The focus detection apparatus 109 is configured to detect a shift amount of output signals depending on light receiving amounts of the image signals A and B, i.e. a shift amount of relative positions of the light beams in a division direction, to determine a defocus amount of the focus lens. Therefore, a charge accumulation operation by the focus detection apparatus 109 makes it possible to obtain an amount and a direction where the focus lens is to be moved (a movement amount and a movement direction) to drive the focus lens.

Reference numeral 110 denotes a photometry apparatus configured to measure an exposure of the image pickup apparatus 100. Reference numeral 111 denotes a lens configured to form an image of the light beam obtained from the object on the photometry apparatus 110. Reference numeral 112 denotes the controller (a microprocessor, or a camera CPU) configured to control the image pickup apparatus 100. The controller 112 functions as a first focus detection unit configured to perform the focus detection by the contrast detection method. The controller 112 also functions as a second focus detection unit configured to perform the focus detection by the phase difference detection method (the imaging plane phase difference detection method) based on the AF signal from the image pickup element 106. Moreover, the controller 112 functions as a control unit configured to select either of the first focus detection unit or the second focus detection unit according to focus information of the interchangeable lens 200 with respect to the image pickup element 106 to perform a focus control (an in-focus control).

Reference numeral 113 denotes an accessory shoe on which an external apparatus such as an external strobe is to be attached. Reference numeral 114 denotes a Fresnel lens of the built-in strobe 108. Reference numeral 115 denotes a finder display unit provided inside the image pickup apparatus 100 and configured to display information on an optical finder in a superimposed manner. Reference numeral 116 denotes an external display unit configured to display various kinds of information on the external apparatus of the image pickup apparatus 100.

Reference numeral 200 denotes the interchangeable lens (the lens unit) including the image pickup optical system. Reference numeral 201 denotes a lens controller (a microprocessor, or a lens CUP) configured to control the interchangeable lens 200. The lens controller 201 also communicates with the controller 112 of the image pickup apparatus 100 via a communication unit. Reference numeral 202 denotes the lens configured to form an object image on the image pickup element 106. The lens 202 includes the focus lens capable of moving in an optical axis direction to perform focusing. Reference numeral 203 denotes an aperture stop apparatus configured to adjust a light intensity.

Figure 2:
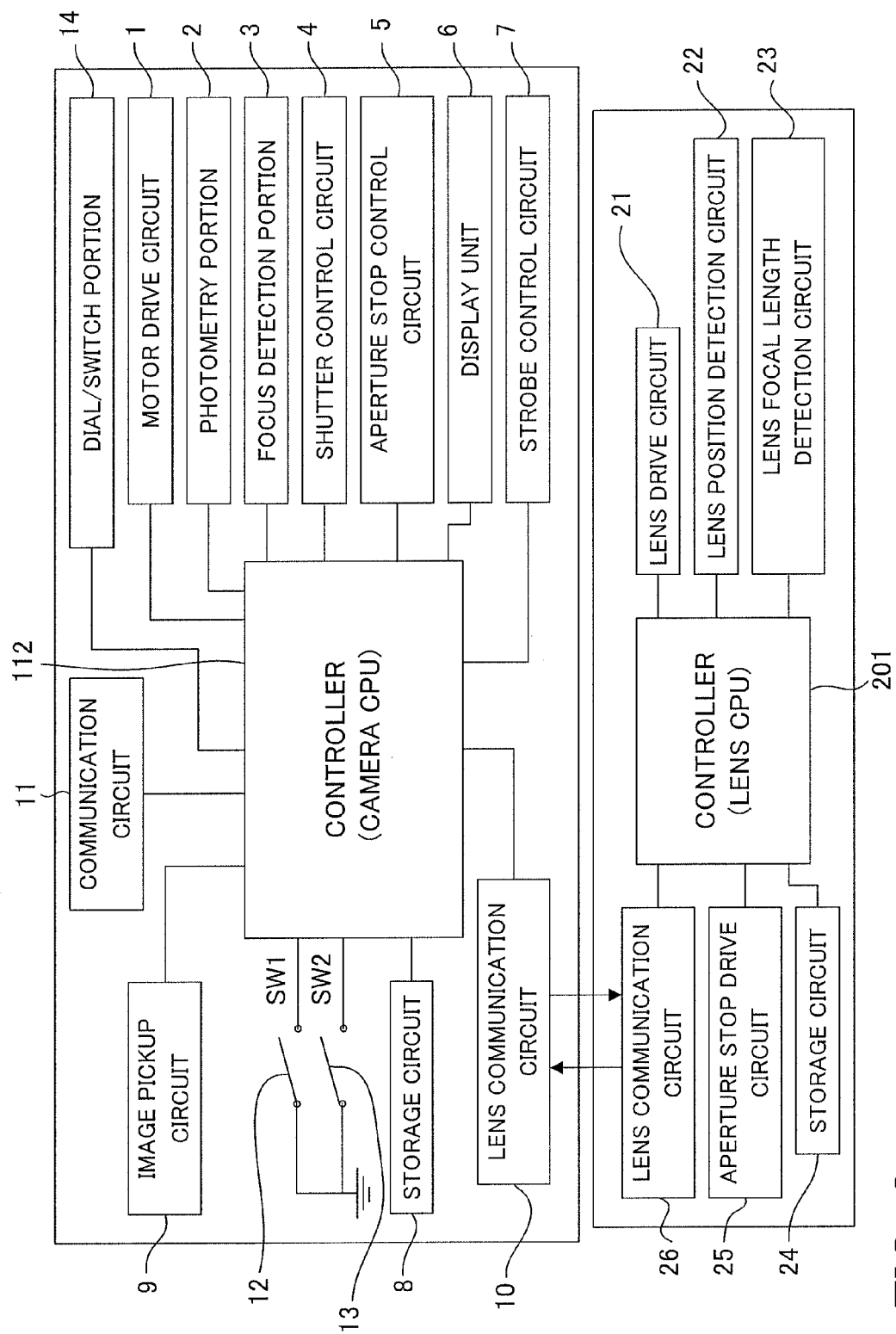
FIG. 2 is a circuit configuration diagram of the image pickup system in the first embodiment.

Subsequently, referring to FIG. 2, the circuit configuration of the image pickup system (the image pickup apparatus 100 and the interchangeable lens 200) will be described. FIG. 2 is a circuit configuration diagram (a block diagram) of the image pickup system.

A motor drive circuit 1 drives a movable portion of the image pickup apparatus 100. A photometry portion 2 measures a luminance of the object. The photometry portion 2 is included in the photometry apparatus 110 illustrated in FIG. 1. A focus detection portion 3 detects a focus state of the interchangeable lens 200. The focus detection portion 3 is included in the focus detection apparatus 109 illustrated in FIG. 1. A shutter control circuit 4 controls an exposure amount of the image pickup apparatus 100. The shutter control circuit 4 is included in the shutter apparatus 107 illustrated in FIG. 1.

An aperture stop control circuit 5 controls the aperture stop apparatus 203 illustrated in FIG. 1 to control the light beam incident on the image pickup apparatus 100. A display apparatus 6 including the finder display unit 115 and the external display unit 116, which are illustrated in FIG. 1, displays a state of the image pickup apparatus 100. A strobe control circuit 7 controls the built-in strobe 108 illustrated in FIG. 1. A storage circuit 8 (a storage unit) stores a setting status of the image pickup apparatus 100. An image pickup circuit 9 controls the image pickup element 106 to perform image pickup processing. Reference numeral 10 denotes a lens communication circuit configured to communicate with the lens controller 201 (the lens CPU) of the interchangeable lens 200 mounted on the image pickup apparatus 100. Reference numeral 11 denotes a communication circuit configured to communicate with the external apparatus such as the external strobe. Reference numeral 12 denotes a switch (SW1) configured to start an image pickup preparation operation. Reference numeral 13 denotes a switch (SW2) configured to start an image pickup operation. Reference numeral 14 denotes a dial/switch portion configured to register various settings and modes of the image pickup apparatus 100 and a best focus correction value.

Reference numeral 21 denotes a lens drive circuit configured to drive the interchangeable lens 200. A lens position detection circuit 22 is configured to detect a position of the interchangeable lens 200. A lens focal length detection circuit 23 is configured to detect a focal length set in the interchangeable lens 200. Reference numeral 24 denotes a storage circuit (a storage unit) configured to store a set value of the interchangeable lens 200. Reference numeral 25 denotes an aperture stop drive circuit configured to drive the aperture stop. The aperture stop drive circuit 25 is included in the aperture stop apparatus 203 illustrated in FIG. 1. Reference numeral 26 denotes a lens communication circuit configured to communicate with the controller 112 (the camera CPU) of the image pickup apparatus 100.

Figure 3:
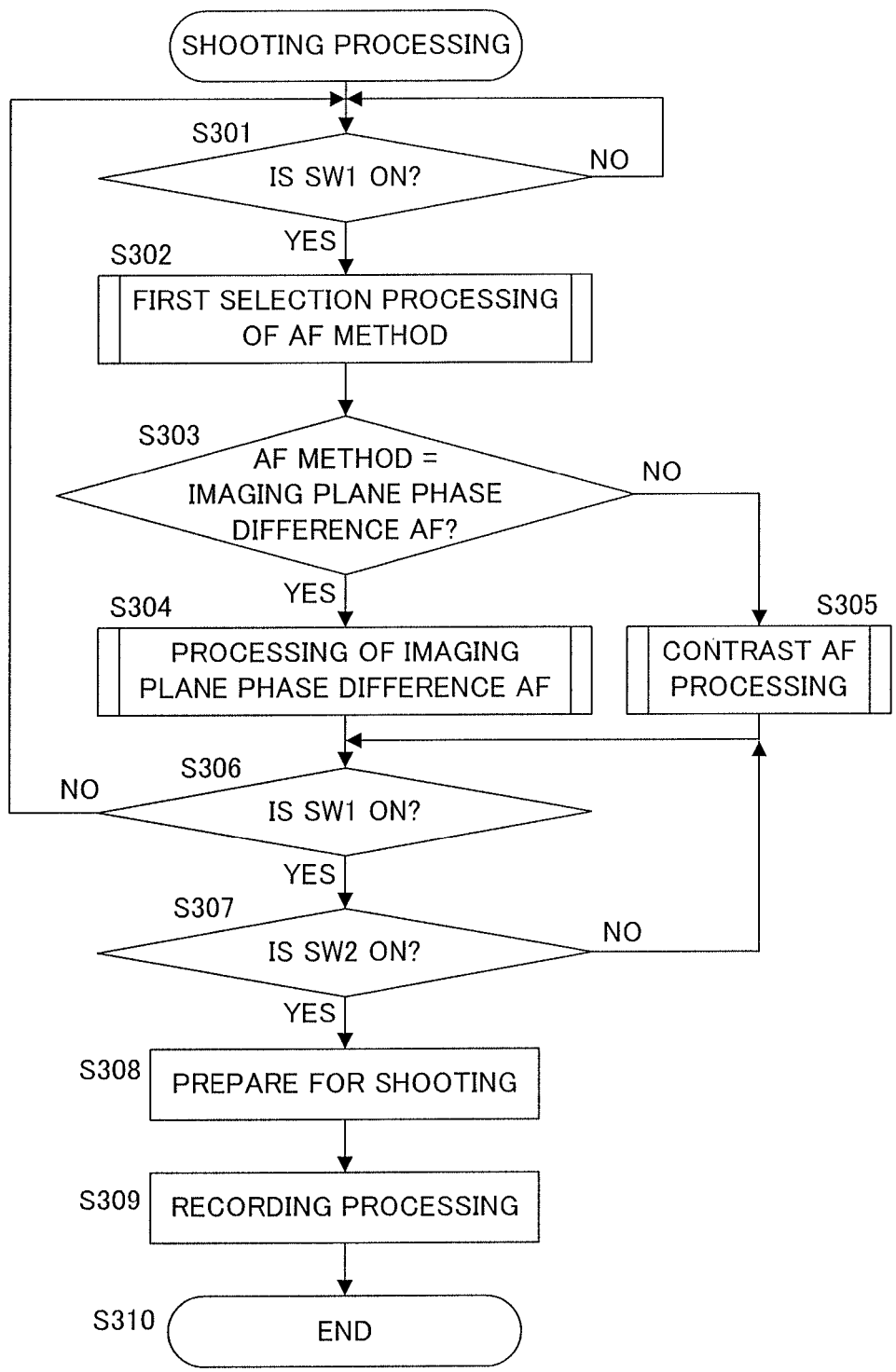
FIG. 3 is a flowchart illustrating a procedure of shooting processing in the first embodiment.

Next, referring to FIG. 3, image pickup processing by the image pickup system of this embodiment will be described. FIG. 3 is a flowchart illustrating a procedure of the shooting processing in this embodiment. Each step of FIG. 3 is mainly performed based on a command (an instruction) of the controller 112 (the camera CPU).

First, at step S301, the controller 112 determines whether or not the switch 12 (the SW1) of the image pickup apparatus 100 is turned on. The controller 112 continues step S301 until the switch 12 (the SW1) is turned on, and the flow proceeds to step S302 when the switch 12 (the SW1) is turned on. Then, at step S302, the controller 112 performs first selection processing of the AF method. In the first selection processing of the AF method, the controller 112 selects either of the first focus detection unit or the second focus detection unit according to focus information of the interchangeable lens 200. In this embodiment, the focus information includes information related to a displacement (shift) of an in-focus position (a best focus shift, or a BF shift) that is generated by an aberration or a chromatic aberration of object light beams of a shot image and the focus detection. The details of the first selection processing of the AF method will be described later.

Subsequently, at step S303, the controller 112 determines whether or not the AF method selected at step S302 is the imaging plane phase difference AF. When the controller 112 determines that the AF method is the imaging plane phase difference AF at step S303, the flow proceeds to step S304 and the controller 112 performs the imaging plane phase difference AF. The details of the imaging plane phase difference AF will be described later. On the other hand, when the controller 112 determines that the AF method is not the imaging plane phase difference AF at step S303, the flow proceeds to step S305 and the controller 112 performs the contrast AF processing. The details of the contrast AF processing will be described later.

After the imaging plane phase difference AF processing at step S304 or the contrast AF processing at step S305 is performed, the flow proceeds to step S306. At step S306, the controller 112 determines whether or not the switch 12 (the SW1) of the image pickup apparatus 100 is on. The flow returns to step S301 when the switch 12 (the SW1) is turned off at step S306.

On the other hand, the flow proceeds to step S307 when the switch 12 (the SW1) is on at step S306. At step 307, the controller 112 determines whether or not the switch 13 (the SW2) of the image pickup apparatus 100 is turned on. The flow returns to step S306 when the switch 13 (the SW2) is off at step S307.

On the other hand, the flow proceeds to step S308 when the switch 13 (the SW2) is turned on at step S307. At step S308, the controller 112 controls the shutter control circuit 4 to prepare for a shooting (capturing an image). Subsequently, at step S309, the controller 112 controls the image pickup circuit 9 to perform recording processing. This series of shooting processing ends upon completion of the above steps.

Figure 4:
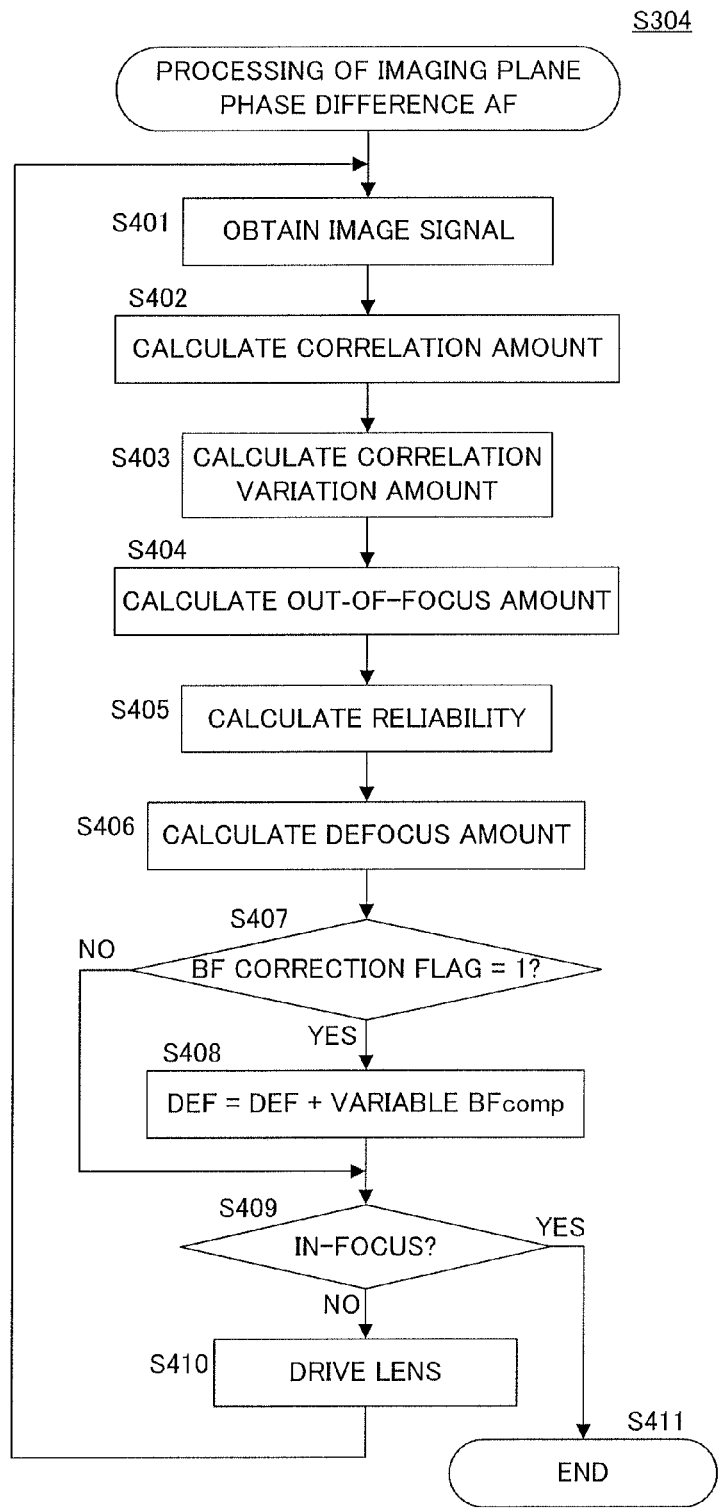
FIG. 4 is a flowchart illustrating a procedure of imaging plane phase difference AF processing in the first embodiment.

Subsequently, referring to FIG. 4, the imaging plane phase difference AF processing performed at step S304 of FIG. 3 will be described. FIG. 4 is a flowchart illustrating a procedure of the imaging plane phase difference AF processing in this embodiment. Each step of FIG. 4 is mainly performed based on a command (an instruction) of the controller 112 (the camera CPU).

First, at step S401, the controller 112 obtains an image signal for the AF within a range arbitrarily set. After that, at step S402, the controller 112 calculates a correlation amount based on the image signal obtained at step S401. Subsequently, at step S403, the controller 112 calculates a correlation variation amount based on the correlation amount calculated at step S402.

Next, at step S404, the controller 112 calculates an out-of-focus amount based on the correlation variation amount calculated at step S403. After that, at step S405, the controller 112 calculates a reliability of the out-of-focus amount calculated at step S404 (a value indicating a reliability level of the calculated out-of-focus amount). As an evaluation value of the reliability, for example, a value of an S level (SELECT LEVEL) disclosed in JP2007-052072 is used. Subsequently, at step S406, the controller 112 converts the out-of-focus amount calculated at step S404 to a defocus amount (DEF).

Next, at step S407, the controller 112 determines whether or not best focus correction (BF correction) is to be performed. The flow proceeds to step S408 when the BF correction is to be performed, that is, a BF correction flag is set to 1. On the other hand, the flow proceeds to step S409 when the BF correction is not to be performed, that is, the BF correction flag is not set to 1.

At step S408, the controller 112 adds a BF correction value (a variable BFcomp) obtained at step S611 or S617 of FIG. 6, which is described later, to the defocus amount (the DEF) calculated at step S406. After that, at step S409, the controller 112 performs an in-focus determination, i.e. determines whether or not an in-focus state is obtained. When the controller 112 determines that the in-focus state is obtained at step S409, the flow proceeds to step S411 and the controller 112 ends the imaging plane phase difference detection AF processing.

On the other hand, the flow proceeds to step S410 when the controller 112 determines that the in-focus state is not obtained at step S409. At step S410, the focus lens is driven by an amount corresponding to the defocus amount (DEF) calculated at step S406 or S408, and then the flow returns to step S401. The driving of the focus lens is performed by the lens controller 201 (the lens CPU) which communicates with the controller 112 (the camera CPU) to control the lens drive circuit 21.

Figure 5:
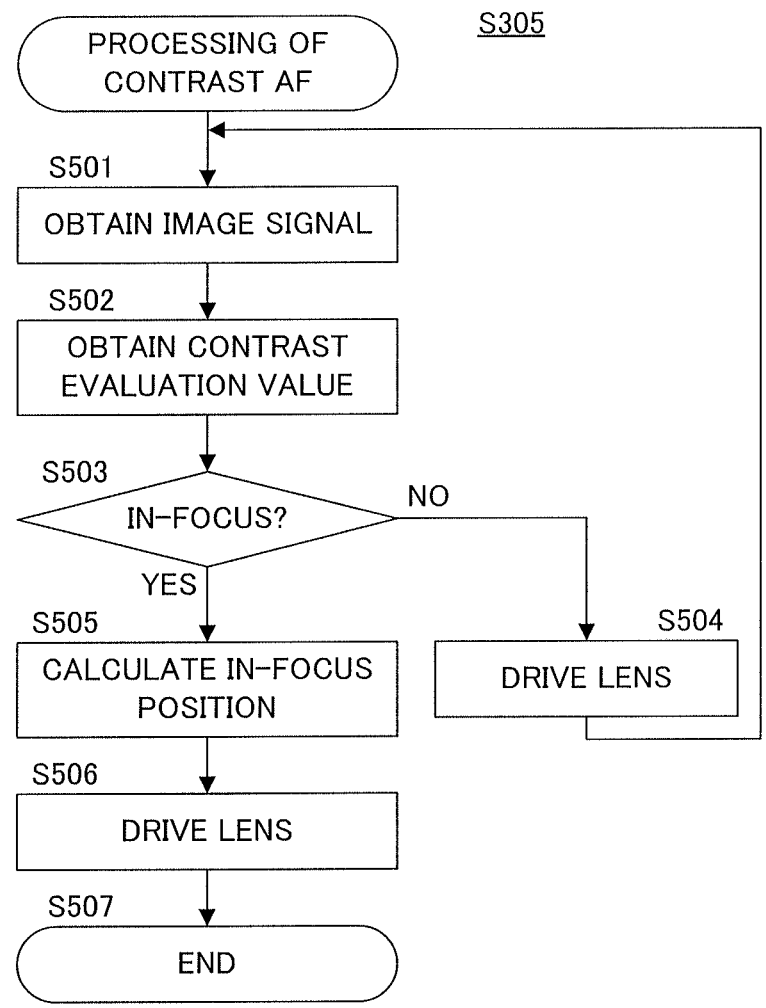
FIG. 5 is a flowchart illustrating a procedure of contrast AF processing in the first embodiment.

Subsequently, referring to FIG. 5, the contrast AF processing performed at step S305 of FIG. 3 will be described. FIG. 5 is a flowchart illustrating a procedure of the contrast AF processing in this embodiment. Each step of FIG. 5 is mainly performed based on a command (an instruction) of the controller 112 (the camera CPU).

First, at step S501, the controller 112 obtains an image signal. After that, at step S502, the controller 112 calculates a contrast evaluation value based on the image signal obtained at step S501. Subsequently, at step S503, the controller 112 performs an in-focus determination, i.e. determines whether or not an in-focus state is obtained.

The flow proceeds to step S504 when the controller 112 determines that the in-focus state is not obtained at step S503. At step S504, the focus lens is driven based on information on the contrast evaluation value obtained at step S502, and then the flow returns to step S501. The driving of the focus lens is performed by the lens controller 201 (the lens CPU) which communicates with the controller 112 to control the lens drive circuit 21.

On the other hand, the flow proceeds to step S505 when the controller 112 determines that the in-focus state is obtained at step S503. At step S505, the controller 112 calculates an in-focus position based on the contrast evaluation value. Subsequently, at step 506, the focus lens is driven based on the information on the contrast evaluation value obtained at step S502. After that, the flow proceeds to step S507 and the contrast AF processing ends.

Subsequently, referring to FIG. 6, the first selection processing of the AF method which is performed at step S302 of FIG. 3 will be described. FIG. 6 is a flowchart illustrating a procedure of the first selection processing of the AF method in this embodiment. Each step of FIG. 6 is mainly performed based on a command (an instruction) of the controller 112 (the camera CPU).

First, at step S601, the controller 112 clears a best focus correction flag (BF correction flag). After that, at step S602, the controller 112 sets the variable BFcomp to 0 (zero). Subsequently, at step S603, the controller 112 performs lens communication by a command A0 (A0 communication) to determine whether or not the mounted interchangeable lens 200 is a lens compatible with a new communication (a new-communication compatible lens).

FIG. 12 is a diagram illustrating the definition of each lens communication in this embodiment. The A0 communication is communication performed by sending the command A0 from the controller 112. Upon receipt of the command A0, the lens controller 201 sends the command A0, as data 1, to the controller 112 of the image pickup apparatus 100, and then sends data, as data 2, indicating whether or not the interchangeable lens 200 is the new-communication compatible lens. When the value of the data 2 is "00", it indicates that the interchangeable lens 200 is a lens incompatible with the new communication (a new-communication incompatible lens). Similarly, when the value of the data 2 is "01", it indicates that the interchangeable lens 200 is the new-communication compatible lens.

Subsequently, at step S604 of FIG. 6, the controller 112 determines whether or not the mounted interchangeable lens 200 is the new-communication compatible lens based on the information obtained at step S603. The flow proceeds to step S605 when the controller 112 determines that the mounted interchangeable lens 200 is the new-communication compatible lens. On the other hand, the flow proceeds to step S613 when the controller 112 determines that the mounted interchangeable lens 200 is not the new-communication compatible lens (i.e. the interchangeable lens is the new-communication incompatible lens).

At step S605, the controller 112 performs lens communication by a command B0 (B0 communication) to determine whether or not there is a best focus shift (a BF shift) and a best focus correction value (a BF correction value) with respect to the attached interchangeable lens 200.

As illustrated in FIG. 12, the B0 communication is communication performed by sending the command B0 from the controller 112. Upon receipt of the command B0, the lens controller 201 sends the command B0, as data 1, to the controller 112 of the image pickup apparatus 100, and then sends data, as data 2, indicating whether or not there is the BF shift and the BF correction value with respect to the mounted interchangeable lens 200. When the value of the data 2 is "00", it indicates that there is not the BF shift for the mounted interchangeable lens 200. Similarly, when the value of the data 2 is "01", it indicates that there is not the BF shift (and that there is the BF correction value) for the mounted interchangeable lens 200. When the value of the data 2 is "02", it indicates that there is the BF shift (and that there is not the BF correction value) for the mounted interchangeable lens 200.

Subsequently, at step S606 of FIG. 6, the controller 112 determines whether or not there is the BF shift with respect to the mounted interchangeable lens 200 based on the information obtained at step S605. That is, the controller 112 determines whether or not the value of the data 2 is "00". The flow proceeds to step S612 when the controller 112 determines that there is not the BF shift for the mounted interchangeable lens 200 (BF information=0, that is, the value of the data 2 is "00") at step S606. On the other hand, the flow proceeds to step S607 when the controller 112 determines that there is the BF shift for the mounted interchangeable lens 200 (BF information≠0, that is, the value of the data 2 is "01" or "02") at step S606.

At step S607, the controller 112 determines whether or not there is the BF correction value with respect to the mounted interchangeable lens 200 based on the information obtained at step S605. That is, the controller 112 determines whether or not the value of the data 2 is "01". The flow proceeds to step S608 when the controller 112 determines that there is the BF shift (and that there is not the BF correction value) for the mounted interchangeable lens 200 (BF information≠1, that is, the value of the data 2 is "02") at step S607. At step S608, the controller 112 sets a focus detection method (an AF method) to the contrast AF.

On the other hand, the flow proceeds to step S609 when the controller 112 determines that there is the BF shift (and that there is the BF correction value) for the mounted interchangeable lens 200 (BF information=1, that is, the value of the data 2 is "01") at step S607. At step S609, the controller 112 perform lens communication by a command C0 (C0 communication) to obtain the BF correction value from the mounted interchangeable lens 200.

As illustrated in FIG. 12, the C0 communication is communication performed by sending the command C0 from the controller 112. Upon receipt of the command C0, the lens controller 201 sends the command C0, as data 1, to the controller 112 of the image pickup apparatus 100, and then sends data of the BF correction values as data 2 and each subsequent data (data 2 to data X).

Subsequently, at step S610 of FIG. 6, the controller 112 sets a BF correction flag. After that, at step S611, the controller 112 assigns the BF correction value obtained at step S609 to the variable BFcomp. Subsequently, at step S612, the controller 112 sets a focus detection method (an AF method) to the imaging plane phase difference AF.

On the other hand, when the controller 112 determines that the mounted interchangeable lens 200 is not the new-communication compatible lens at step S604, the flow proceeds to step S613 and the controller 112 performs lens communication by a command 80 (80 communication) to obtain (receive) a lens ID.

As illustrated in FIG. 12, the 80 communication is communication performed by sending a command 80 from the controller 112. Upon receipt of the command 80, the lens controller 201 sends the command 80, as data 1, to the controller 112 of the image pickup apparatus 100 and then sends data indicating an ID and a serial number of the interchangeable lens 200 as data 2 and each subsequent data. More specifically, the value of the data 2 indicates the lens ID, and data 3 and data 4 indicate higher serial numbers and lower serial numbers of the interchangeable lens 200, respectively.

Figures 10, 11:
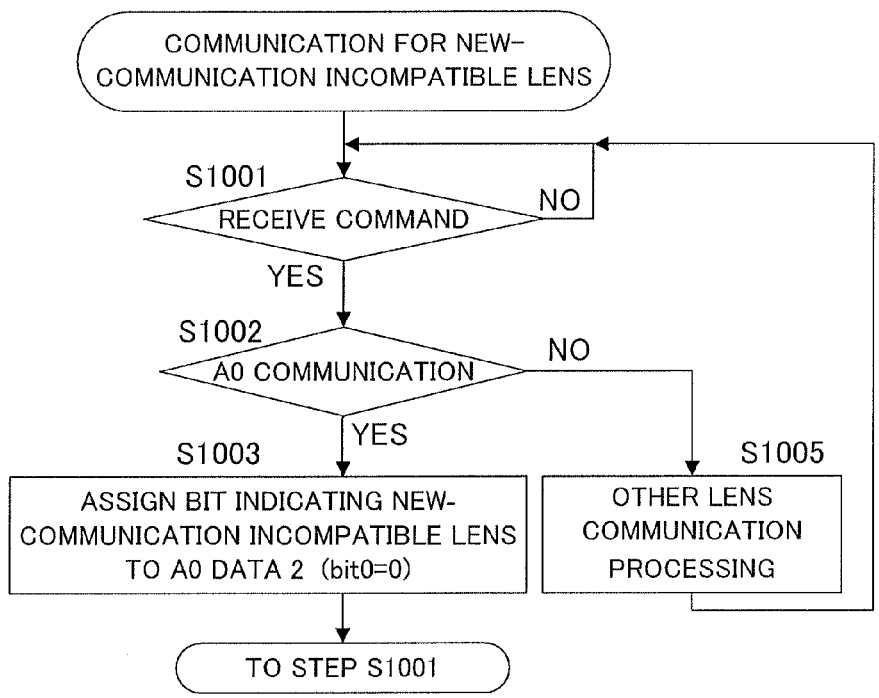
FIG. 10 is a flowchart illustrating a procedure of a lens communication of a new-communication incompatible lens in the first embodiment.
FIG. 11 is a table which is relevant to a best focus correction stored in an image pickup apparatus in each of the first and second embodiments.

Subsequently, at step S614, the controller 112 determines whether or not the mounted interchangeable lens 200 has a large amount of the BF shift. FIG. 11 is a table relevant to the BF correction (the BF correction related table) stored in the image pickup apparatus 100. The determination at step S614 is performed based on the table of relevant to the BF correction in FIG. 11. The table of relevant to the BF correction in FIG. 11 has a data structure including a lens ID, an amount of the BF shift (large or small), presence or absence of a BF correction value, and the BF correction value. The controller 112 refers to the table relevant to the BF correction and determines whether or not the mounted interchangeable lens 200 has a large amount of BF shift based on the lens ID received at step S613.

The flow proceeds to step S612 when the controller 112 determines that the mounted interchangeable lens 200 does not have a large amount of BF shift at step S614. On the other hand, the flow proceeds to step S615 when the controller 112 determines that the mounted interchangeable lens 200 has a large amount of BF shift (when the lens ID of the mounted interchangeable lens 200 is either of "01" to "04" in FIG. 11). At step S615, the controller 112 determines whether or not the image pickup apparatus 100 has a BF correction value by using the table relevant to the BF correction illustrated in FIG. 11. When the image pickup apparatus 100 does not have a BF correction value (when the lens ID of the mounted interchangeable lens 200 is "01" or "02"), the flow proceeds to step S608 and the controller 112 sets a focus detection method (an AF method) to the contrast AF.

On the other hand, the flow proceeds to step S616 when the image pickup apparatus 100 has a BF correction value (when the lens ID is "03" or "04"). At step S616, the controller 112 sets a BF correction flag. Subsequently, at step S617, the controller 112 assigns the BF correction value of the table relevant to the BF correction (+60 μm when the lens ID is "03", or −50 μm when the lens ID is "04") illustrated in FIG. 11 to the variable BFcomp. Subsequently, at step S612, the controller 112 sets a focus detection method (an AF method) to the imaging plane phase difference AF. After that, the flow proceeds to step S618 and the controller 112 ends the first selection processing of the AF method.

Figure 9:
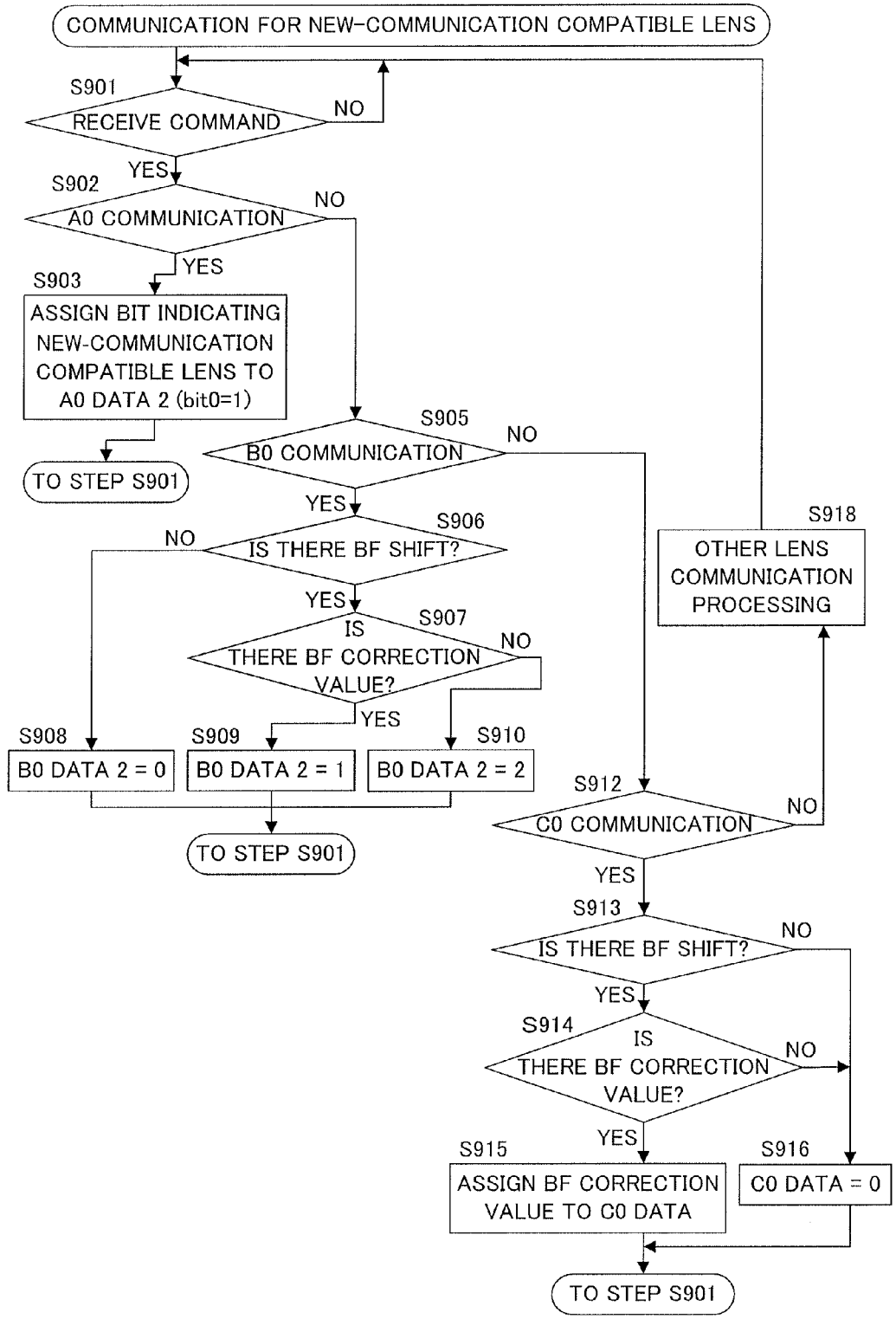
FIG. 9 is a flowchart illustrating a procedure of a lens communication of a new-communication compatible lens in the first embodiment.

Next, referring to FIG. 9, the lens communication performed when the interchangeable lens 200 in this embodiment is the new-communication compatible lens will be described. FIG. 9 is a flowchart illustrating a procedure of the lens communication in the new-communication compatible lens. Each step of FIG. 9 is mainly performed based on a command (an instruction) of the lens controller 201 (the lens CPU) of the interchangeable lens 200 (the new-communication compatible lens).

First, at step S901, the lens controller 201 is on standby until it receives a command from the controller 112 (the camera CPU). When the lens controller 201 receives the command at step S901, the flow proceeds to step S902 and the lens controller 201 determines whether or not the command is the A0 communication based on the command received as data sent by the image pickup apparatus 100. The flow proceeds to step S903 when the command received by the lens controller 201 is A0 (when the communication is the A0 communication). On the other hand, the flow proceeds to step S905 when the lens controller 201 determines that the received command is not A0.

When the lens controller 201 receives the command A0 at step S902, it sets data indicating whether or not the mounted interchangeable lens 200 is the new-communication compatible lens and then sends the data to the controller 112. As illustrated in FIG. 12, when the mounted interchangeable lens 200 is the new-communication compatible lens, the flow returns to step S901 after the lens controller 201 sets the data 2 to "01" and sends the data 2 to the controller 112.

When the lens controller 201 receives a command other than the command A0 at step S902, it determines whether or not the communication is the B0 communication based on the received command at step S905. The flow proceeds to step S906 when the received command is the command B0 (when the communication is the B0 communication). On the other hand, the flow proceeds to step S912 when the received command is not B0.

When the lens controller 201 receives the command B0 at step S905, it determines whether or not the mounted interchangeable lens 200 has a BF shift at step S906. The flow proceeds to step S907 when the lens controller 201 determines that the mounted interchangeable lens 200 has the BF shift. On the other hand, the flow proceeds to step S908 when the lens controller 201 determines that the mounted interchangeable lens 200 does not have the BF shift. At step S907, the lens controller 201 determines whether or not the mounted interchangeable lens 200 has a BF correction value. The flow proceeds to step S909 when the lens controller 201 determines that the mounted interchangeable lens 200 has the BF correction value. On the other hand, the flow proceeds to step S910 when the lens controller 201 determines that the mounted interchangeable lens 200 does not have the BF correction value. Whether or not the mounted interchangeable lens 200 has the BF shift and the BF correction value depends on a lens ID.

At steps S908 to S910, the lens controller 201 performs data setting for BF information to be sent to the controller 112 (the camera CPU) and then sends the BF information to the image pickup apparatus 100. As illustrated in FIG. 12, at step S908, the lens controller 201 sets data 2 to "00" and sends the data 2 to the controller 112 (the camera CPU), and then the flow returns to step S901. At step S909, the lens controller 201 sets data 2 to "01" and sends the data 2 to the controller 112, and then the flow returns to step S901. At step S910, the lens controller 201 sets data 2 to "02" and then sends the data 2 to the controller 112, and then the flow returns to step S901.

When the lens controller 201 receives a command other than the command B0 at step S905, it determines, at step S912, whether or not the communication is C0 communication based on the received command. The flow proceeds to step S913 when the command received by the lens controller 201 at step S912 is C0 (when the communication is C0 communication). On the other hand, the flow proceeds to step S918 when the received command is not C0. When the lens controller 201 receives other commands (e.g. the command 80) according to the definition of each lens communication illustrated in FIG. 12, it performs other lens communication processing according to the received command at step S918. After that, the flow returns to step S901.

When the lens controller 201 receives the command C0 at step S912, it determines, at step S913, whether or not the mounted interchangeable lens 200 has a BF shift. The flow proceeds to step S914 when the lens controller 201 determines that the mounted interchangeable lens 200 has the BF shift. On the other hand, the flow proceeds to step S916 when the lens controller 201 determines that the mounted interchangeable lens 200 does not have the BF shift. At step S914, the lens controller 201 determines whether or not the mounted interchangeable lens 200 has a BF correction value. The flow proceeds to step S915 when the lens controller 201 determines that the mounted interchangeable lens 200 has the BF correction value. On the other hand, the flow proceeds to step S916 when the lens controller 201 determines that the mounted interchangeable lens 200 does not have the BF correction value. Whether or not the mounted interchangeable lens 200 has the BF shift and the BF correction value depends on the lens ID.

At steps S915 and S916, the lens controller 201 performs data setting for the BF correction value to be sent to the controller 112 (the camera CPU) and then sends the BF correction value to the controller 112. As illustrated in FIG. 12, at step S915, the lens controller 201 sets the BF correction value to data 2 to data X to be sent to the controller 112 and sends the data 2 to the data X to the controller 112, and then the flow returns to step S901. At step S916, the lens controller 201 sets data 2 to be sent to the controller 112 to "00" and sends the data 2 to the controller 112, and then the flow returns to step S901.

Next, referring to FIG. 10, the lens communication performed when the interchangeable lens 200 in this embodiment is the new-communication incompatible lens will be described. FIG. 10 is a flowchart illustrating a procedure of the lens communication in the new-communication incompatible lens. Each step of FIG. 10 is mainly performed based on a command of the lens controller 201 (the lens CPU) of the interchangeable lens 200 (the new-communication incompatible lens).

First, at step S1001, the lens controller 201 is on standby until it receives a command from the controller 112 (the camera CPU). When the lens controller 201 receives the command at step S1001, the flow proceeds to step S1002 and the lens controller 201 determines whether or not the command is the A0 communication based on the command received as data sent by the image pickup apparatus 100. The flow proceeds to step S1003 when the command received by the lens controller 201 is A0 (when the communication is the A0 communication). On the other hand, the flow proceeds to step S1005 when the lens controller 201 determines that the received command is not A0.

When the lens controller 201 receives the command A0 at step S1002, it sets data indicating whether or not the mounted interchangeable lens 200 is the new-communication incompatible lens and then sends the data to the controller 112 at step S1003. As illustrated in FIG. 12, when the mounted interchangeable lens 200 is the new-communication incompatible lens, the lens controller 201 sets the data 2 to "00" and sends the data 2 to the controller 112, and then the flow returns to step S1001. When the lens controller 201 receives other commands (e.g. the command 80) according to the definition of each lens communication illustrated in FIG. 12, it performs other lens communication processing according to the received command at step S1005, and then the flow returns to step S1001.

Figure 6:
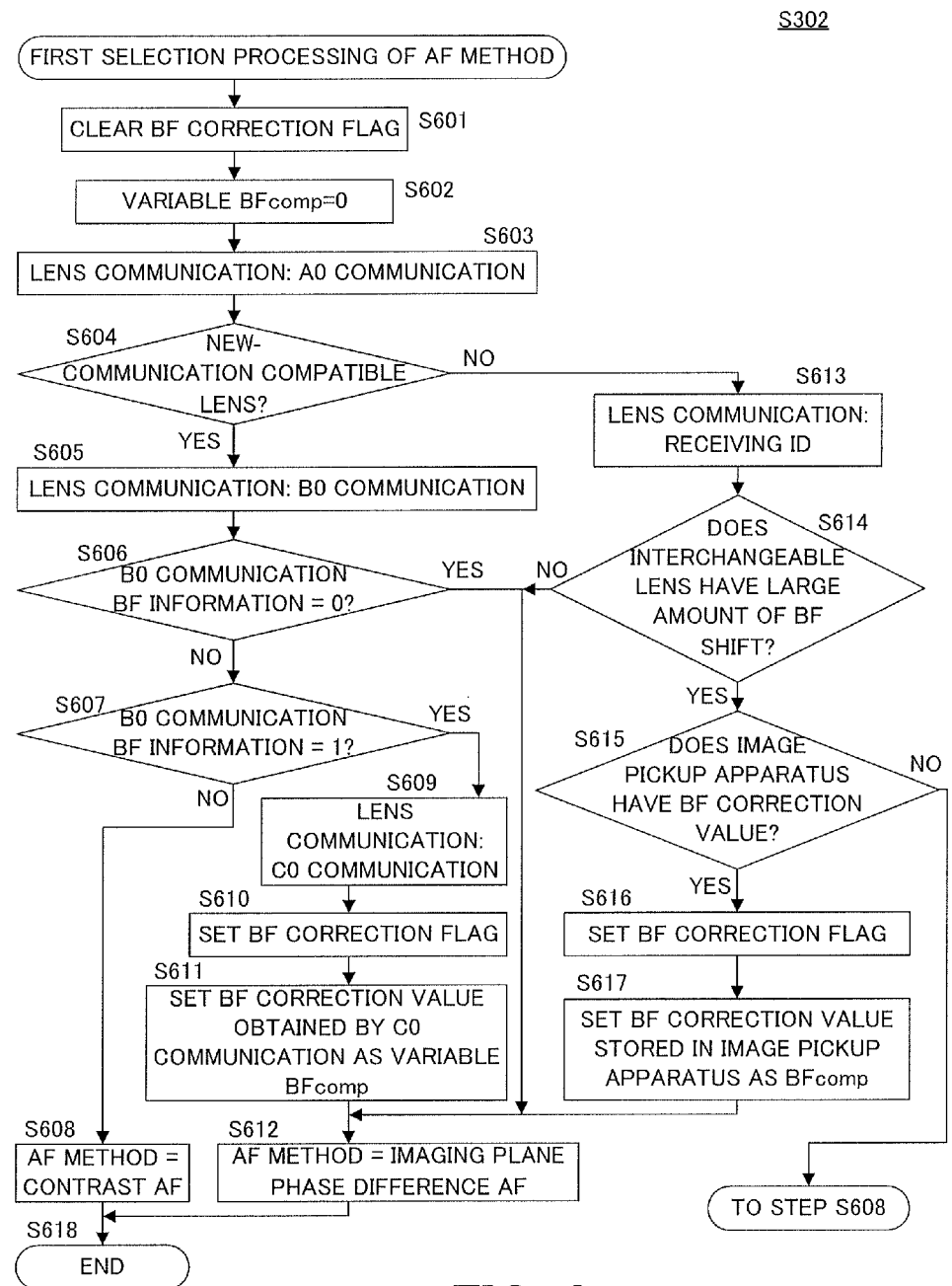
FIG. 6 is a flowchart illustrating a procedure of first selection processing of an AF method in the first embodiment.

As described above, in this embodiment, the controller 112 performs the lens communication by the command A0 (the A0 communication) to determine (identify) whether or not the mounted interchangeable lens 200 is the new-communication compatible lens (step S603 of FIG. 6). When the new-communication compatible lens is mounted ("YES" at step S604), the controller 112 obtains BF information from the new-communication compatible lens (step S605). That is, the controller 112 receives focus information from the interchangeable lens 200.

When the mounted interchangeable lens 200 does not have the BF shift ("YES" at step S606), the controller 112 sets an AF method to the imaging plane phase difference AF (step S612). That is, the controller 112 selects the second focus detection unit (the imaging plane phase difference AF) to perform the focus control when the focus information received from the interchangeable lens 200 is information indicating that the mounted interchangeable lens 200 does not have the focus shift.

On the other hand, when the interchangeable lens 200 has the BF shift ("NO" at step S606) and has the BF correction value ("YES" at step S607), the controller 112 obtains the BF correction value (step S609) from the mounted interchangeable lens 200. Then, the controller 112 sets an AF method to the imaging plane phase difference AF (step S612). That is, when the focus information received from the interchangeable lens 200 is information indicating that the interchangeable lens 200 has the focus shift and has the focus correction value to correct the focus shift, the controller 112 selects the second focus detection unit. Then, the controller 112 performs the focus control by using the focus correction value received from the interchangeable lens 200.

When the interchangeable lens 200 has the BF shift and does not have the BF correction value ("NO" at step S607), the controller 112 sets an AF method to the contrast AF (step S608). That is, when the focus information received from the interchangeable lens 200 is information indicating that the interchangeable lens 200 has the focus shift and does not have the focus correction value to correct the focus shift, the controller 112 selects the first focus detection unit to perform the focus control.

When the interchangeable lens 200 is the new-communication incompatible lens ("NO" at step S604), the controller 112 performs the lens communication by the command 80 (the 80 communication) to obtain a lens ID (step S613). That is, the controller 112 specifies the focus information based on the lens ID received from the interchangeable les 200.

When the controller 112 determines, with reference to the table relevant to the BF correction (FIG. 11) stored in the image pickup apparatus 100, that the interchangeable lens 200 does not have a large amount of focus shift ("NO" at step S614), the controller 112 sets an AF method to the imaging plane phase difference AF (step S612). That is, when the controller 112 determines that the interchangeable lens 200 does not have a large amount of focus shift (the interchangeable lens 200 has a focus shift less than a predetermined value) based on the lens ID received from the interchangeable lens 200, it selects the second focus detection unit to perform the focus control.

On the other hand, when the interchangeable lens 200 has a large amount of BF shift ("YES" at step S614) and has the BF correction value stored in the image pickup apparatus 100 ("YES" at step S615), the controller 112 obtains the BF correction value from the table relevant to the BF correction stored in the image pickup apparatus 100 (steps S616 and S617). After that, the controller 112 sets an AF method to the imaging plane phase difference AF (step S612). That is, when the focus information specified based on the lens ID is information indicating that the interchangeable lens 200 has a large amount of focus shift (the interchangeable lens 200 has a focus shift not less than the predetermined value) and has a focus correction value, the controller 112 selects the second focus detection unit. Then, the controller 112 performs the focus control by using the focus correction value received from the interchangeable lens 200.

On the other hand, when the interchangeable lens 200 does not have the BF correction value stored in the image pickup apparatus 100 ("NO" at step S615), the controller 112 sets an AF method to the contrast AF (step S608). That is, when the focus information specified based on the lens ID is information indicating that the interchangeable lens 200 has a large amount of focus shift and does not have a focus correction value, the controller 112 selects the first focus detection unit to perform the focus control.

The configuration of this embodiment makes it possible, with respect to a conventional interchangeable lens, i.e. a new-communication incompatible lens, to appropriately select the imaging plane phase difference AF or the contrast AF to be performed along with the BF correction by storing the table relevant to the BF correction in the image pickup apparatus 100. On the other hand, the configuration of this embodiment makes it possible, with respect to a new interchangeable lens, i.e. a new-communication compatible lens, to select an appropriate focus detection method by obtaining focus information from the lens. Accordingly, an appropriate focus detection can be performed in which an influence of a focus shift caused by an aberration is suppressed depending on a mounted interchangeable lens.

Second Embodiment

Next, referring to FIGS. 7 and 8, the second embodiment of the present invention will be described. This embodiment relates to second selection processing of an AF method in which a user can register a focus correction value, which is performed instead of the first selection processing of the AF method performed at step S302 of FIG. 3.

Figure 7:
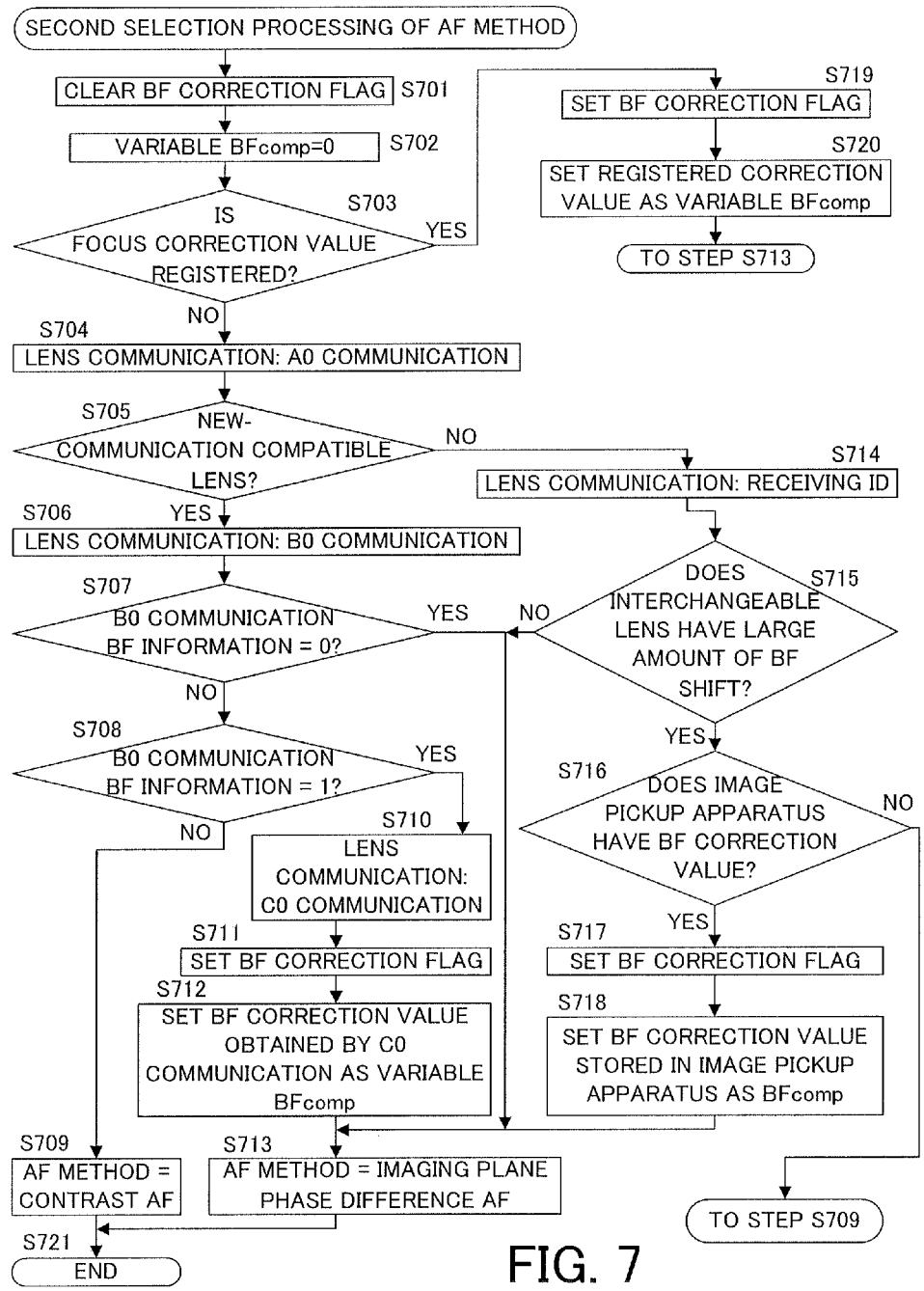
FIG. 7 is a flowchart illustrating a procedure of second selection processing of an AF method in a second embodiment.
Figure 8:
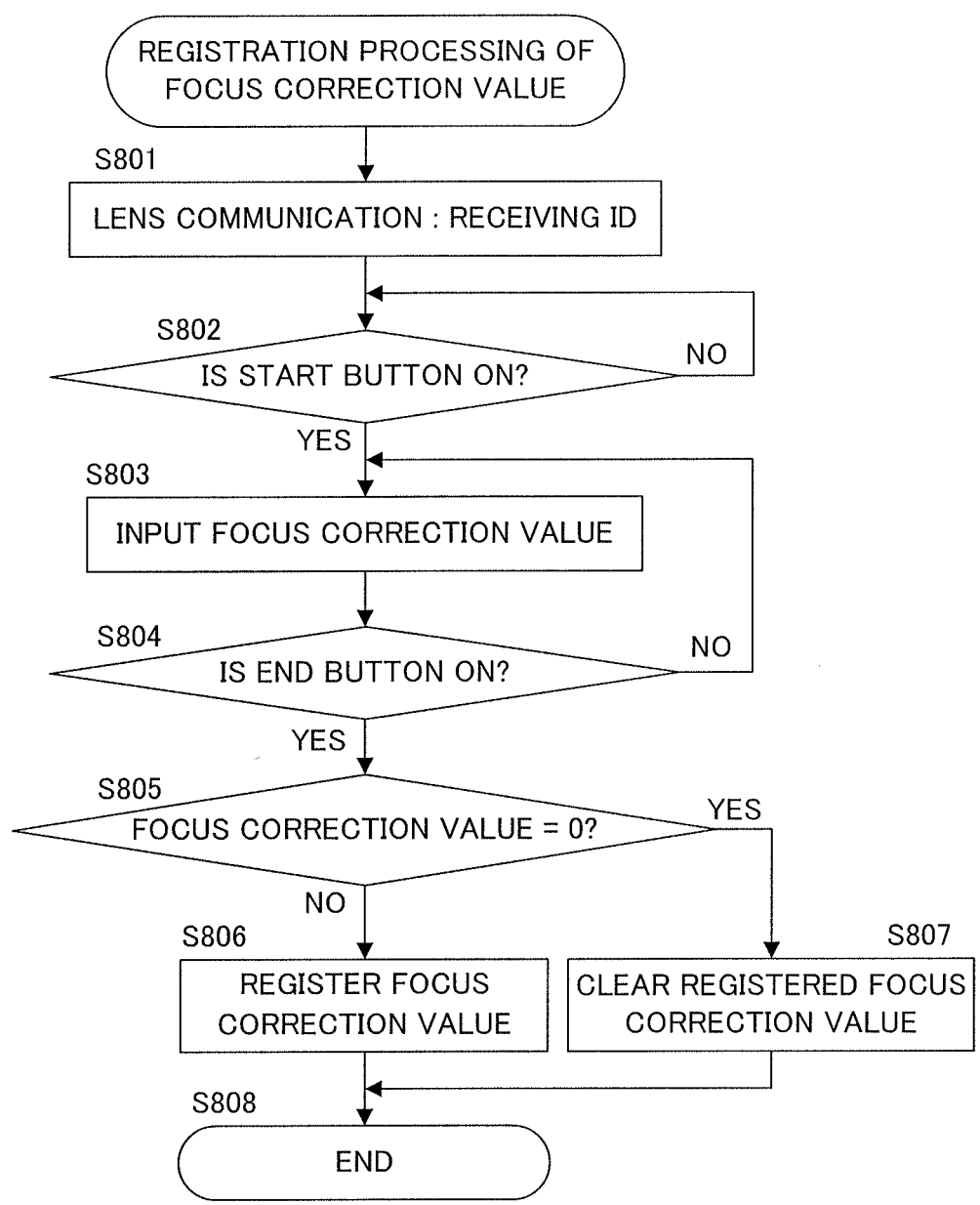
FIG. 8 is a flowchart illustrating a procedure of registration processing of a focus correction value in the second embodiment.

FIG. 7 is a flowchart illustrating a procedure of the second selection processing of the AF method in this embodiment. Each step of FIG. 7 is mainly performed based on a command (an instruction) of the controller 112 (the camera CPU). FIG. 7 is different from the flowchart of FIG. 6 (the first embodiment) in that steps S703, S719, and S720 are added. Since the steps S701, S702, S704 to S718, and S721 are the same as steps S601 to S618 of FIG. 6 respectively, the description thereof will be omitted.

Subsequently to step S702, at step S703, the controller 112 (a registration unit) determines whether or not a focus correction value is registered. The flow proceeds to step S719 when the controller 112 determines that the focus correction value is registered. On the other hand, the flow proceeds to step S704 when the controller 112 determines that the focus correction value is not registered. The registration of a focus correction value will be described later.

The controller 112 sets a BF correction flag at step S719 when it determines, at step S703, that the focus correction value is registered. Subsequently, at step S720, the controller 112 assigns the registered focus correction value to the variable BFcomp. After that, the flow proceeds to step S713 and the controller 112 sets an AF method to the imaging plane phase difference AF.

Next, referring to FIG. 8, the registration of a focus correction value in this embodiment will be described. FIG. 8 is a flowchart illustrating a procedure of registration processing of the focus correction value. Each step of FIG. 8 is mainly performed based on a command (an instruction) of the controller 112 (the camera CPU). In this embodiment, a BF correction value can be registered for each lens by using lens IDs and serial numbers. In this embodiment, the maximum registration number of BF correction values is, for example, 50.

First, at step S801, the controller 112 performs the lens communication by the command 80 (the 80 communication) as illustrated in FIG. 12 to obtain a lens ID. In the command 80, the value of data 2 received by the image pickup apparatus 100 indicates the lens ID, and the values of data 3 and data 4 indicate a higher serial number and a lower serial number, respectively. Subsequently, at step S802, the controller 112 is on standby until a start button (not illustrated in the drawing) is pressed.

When the start button is pressed at step S802, the flow proceeds to step S803 and a focus correction value (the BF correction value) is input via an operating member (not illustrated in the drawing). In this embodiment, the focus correction value can be input by the micrometer within a range of ±50 μm.

Subsequently, at step S804, the controller 112 determines the status of an end button (not illustrated in the drawing). The controller 112 continues step S804 until the end button is pressed and then the flow proceeds to step S805. At step S805, the controller 112 determines the focus correction value (the BF correction value) input at step S803. The flow proceeds to step S807 when the focus correction value is 0 (zero). At step S807, the controller 112 clears the BF correction value registered for each lens.

On the other hand, the flow proceeds to step S806 when the focus correction value is not 0 (zero). At step S806, the controller 112 registers a focus correction value (a BF correction value) for each lens. After that, the flow proceeds to step S808 and the controller 112 ends the registration processing of the focus correction value.

As described above, in this embodiment, when a focus correction value (a BF correction value) is registered ("YES" at step S703), the controller 112 sets an AF method to the imaging plane phase difference AF by using the registered BF correction value (steps S719 and S720). That is, the image pickup apparatus 100 of this embodiment further includes a registration unit configured to register a focus correction value to correct a focus shift of the interchangeable lens 200. The controller 112 selects the second focus detection unit and then performs the focus control by using the focus correction value registered in the registration unit. On the other hand, the controller 112 performs the same processing as that in the first embodiment when the BF correction value is not registered ("NO" at step S703).

Moreover, in order to identify whether or not the mounted interchangeable lens 200 is the new-communication compatible lens, the controller 112 performs the lens communication by the command A0 (step S704 of FIG. 7). The controller 112 obtains the BF information from the interchangeable lens 200 (step S706) when the mounted interchangeable lens 200 is the new-communication compatible lens ("YES" at step S705). In addition, the controller 112 sets an AF method to the imaging plane phase difference AF (step S713) when the mounted interchangeable lens 200 does not have the BF shift ("YES" at step S707)

When the interchangeable lens 200 has the BF shift ("NO" at step S707) and has the BF correction value ("YES" at step S708), the controller 112 obtains the BF correction value from the interchangeable lens 200 (step S710) and then sets an AF method to the imaging plane phase difference AF (step S713). When the interchangeable lens 200 does not have the BF correction value ("NO" at step S708), the controller 112 sets an AF method to the contrast AF (step S709).

When the interchangeable lens 200 is the new-communication incompatible lens ("NO" at step S705), the controller 112 performs the lens communication by the command 80 to obtain a lens ID (step S714).

When the controller 112 determines, with reference to the table relevant to the BF correction (FIG. 11) stored in the image pickup apparatus 100 (the controller 112), that the interchangeable lens 200 does not have a large amount of focus shift ("NO" at step S715), the controller 112 sets an AF method to the imaging plane phase difference AF (step S713). When the interchangeable lens 200 has the large amount of focus shift ("YES" at step S715) and the BF correction value is stored in the image pickup apparatus 100 ("YES" at step S716), the controller 112 obtains the BF correction value from the table relevant to the BF correction stored in the image pickup apparatus 100 (steps S717 and S718). Then, the controller 112 sets an AF method to the imaging plane phase difference AF (step S713). On the other hand, the BF correction value for the interchangeable lens 200 is not stored in the image pickup apparatus 100 ("NO" at step S716), the controller 112 sets an AF method to the contrast AF (step S709). Accordingly, also in this embodiment, an appropriate focus detection can be performed in which an influence of a focus shift caused by an aberration is suppressed depending on a mounted interchangeable lens.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-079723, filed on Apr. 5, 2013, which is hereby incorporated by reference herein in its entirety.

What is claimed is:

1. An image pickup apparatus on which a lens unit is to be removably mounted, the image pickup apparatus comprising:
an image pickup element including a plurality of pixels, each pixel including a plurality of photodiodes, the plurality of photodiodes corresponding to a micro lens;
a first focus detection unit configured to perform a focus detection by a contrast detection method based on a signal output from the image pickup element;
a second focus detection unit configured to perform a focus detection by a phase difference detection method based on a pair of image signals output from the image pickup element; and
a control unit configured to perform a focus control based on an in-focus position detected by one of the first focus detection unit and the second focus detection unit,
wherein the control unit is configured to receive, from the mounted lens unit, first information related to a displacement of the in-focus position by the phase difference detection method caused by an aberration of an image pickup optical system of the lens unit and determine whether to use the second focus detection unit for the focus control according to the first information.

2. The image pickup apparatus according to claim 1, wherein when the first information received from the lens unit is information indicating that there is no displacement of the in-focus position by the phase difference detection method caused by the aberration of the image pickup optical system, the control unit performs the focus control by using the second focus detection unit.

3. The image pickup apparatus according to claim 1, wherein when the first information received from the lens unit is information indicating that there is the displacement of the in-focus position by the phase difference detection method caused by the aberration of the image pickup optical system and that a correction value to correct the displacement of the in-focus position is included, the control unit performs the focus control by using the second focus detection unit.

4. The image pickup apparatus according to claim 3, wherein the control unit is further configured to receive second information related to the correction value to correct the displacement of the in-focus position and correct the in-focus position detected by the second focus detection unit by using the second information.

5. The image pickup apparatus according to claim 1, wherein when the first information received from the lens unit is information indicating that there is the displacement of the in-focus position by the phase difference detection method caused by the aberration of the image pickup optical system and that a correction value to correct the displacement of the in-focus position is not included, the control unit performs the focus control by using the first focus detection unit.

6. The image pickup apparatus according to claim 1, wherein when a first lens unit compatible with a predetermined communication method is mounted, the control unit performs a communication to obtain the first information by using the predetermined communication method, and
wherein when a second lens unit incompatible with the predetermined communication method is mounted, the control unit performs a communication to obtain type information of the second lens unit.

7. The image pickup apparatus according to claim 6, wherein when the second lens unit is mounted, the control unit determines whether the displacement of the in-focus position by the phase difference detection method caused by the aberration of the image pickup optical system is smaller than a predetermined value based on the received type information, and
wherein when the displacement of the in-focus position is smaller than the predetermined value, the control unit performs the focus control by using the second focus detection unit.

8. The image pickup apparatus according to claim 6, wherein when the displacement of the in-focus position is not smaller than the predetermined value, the control unit determines whether the image pickup apparatus stores a correction value corresponding to the type information, and
wherein when the image pickup apparatus stores the correction value, the control unit corrects the in-focus position detected by the second focus detection unit by using the correction value to perform the focus control.

9. The image pickup apparatus according to claim 8, wherein when the image pickup apparatus does not store the correction value corresponding to the type information, the control unit performs the focus control by using the first focus detection unit.

10. The image pickup apparatus according to claim 1, further comprising a registration unit configured to register a correction value to correct the displacement of the in-focus position of the lens unit,
wherein the control unit corrects the in-focus position detected by the second focus detection unit by using the correction value registered in the registration unit to perform the focus control.

11. The image pickup apparatus according to claim 1, wherein the image pickup element is configured to receive lights from different pupil regions of the image pickup optical system by each of the photodiodes corresponding to the micro lens to generate the pair of image signals.

12. A lens unit to be removably mounted on an image pickup apparatus which includes an image pickup element including a plurality of pixels, each pixel including a plurality of photodiodes, and the plurality of photodiodes corresponding to a micro lens, the lens unit comprising:
an image pickup optical system; and
a lens controller configured to send data to the mounted image pickup apparatus,
wherein the lens controller is configured to send, to the image pickup apparatus, first information related to a displacement of an in-focus position by a phase difference detection method caused by an aberration of the image pickup optical system, and
wherein the first information indicates that there is the displacement of the in-focus position and contains information on a correction value to correct the displacement of the in-focus position, wherein a focus control is performed based on an in-focus position detected by one of a contrast detection method based on a signal output from the image pickup element and the phase difference detection method based on a pair of image signals output from the image pickup element, and it is determined whether to use the phase difference detection method for the focus control according to the first information.

13. A method of controlling an image pickup apparatus on which a lens unit is to be removably mounted, the image pickup apparatus including an image pickup element including a plurality of pixels, each pixel including a plurality of photodiodes corresponding to a micro lens, the method comprising:

a first focus detection step of performing a focus detection by a contrast detection method based on a signal output from the image pickup element;

a second focus detection step of performing a focus detection by a phase difference detection method based on a pair of image signals output from the image pickup element; and a control step of performing a focus control based on an in-focus position detected in one of the first focus detection step and the second focus detection step, wherein, in the control step, first information related to a displacement of the in-focus position by the phase difference detection method caused by an aberration of an image pickup optical system of the mounted lens unit is received from the lens unit and then whether to use a result of the second focus detection step for the focus control is determined according to the first information.

14. A method of controlling a lens unit removably mounted on an image pickup apparatus which includes an image pickup element including a plurality of pixels, each pixel including a plurality of photodiodes, and the plurality of photodiodes corresponding to a micro lens, the lens unit including an image pickup optical system, the method comprising:

a control step of sending data to the mounted image pickup apparatus, wherein, in the control step, first information related to a displacement of an in-focus position by a phase difference detection method caused by an aberration of the image pickup optical system is sent to the image pickup apparatus, and wherein the first information indicates that there is the displacement of the in-focus position and contains information on a correction value to correct the displacement of the in-focus position, wherein a focus control is performed based on an in-focus position detected by one of a contrast detection method based on a signal output from the image pickup element and the phase difference detection method based on a pair of image signals output from the image pickup element, and it is determined whether to use the phase difference detection method for the focus control according to the first information.

* * * * *